US012699173B2

(12) United States Patent
Ludlow et al.

(10) Patent No.: US 12,699,173 B2
(45) Date of Patent: Aug. 4, 2026

(54) MIMO RADAR USING A FREQUENCY SCANNING ANTENNA

(71) Applicant: PROVIZIO LIMITED, Limerick (IE)

(72) Inventors: Peter Ludlow, Lisburn (GB); Steven Christie, Drumbo (GB); Denver Humphrey, Ballymena (GB)

(73) Assignee: PROVIZIO LIMITED, Limerick (IE)

( * ) Notice: Subject to any disclaimer, the term of this patent is extended or adjusted under 35 U.S.C. 154(b) by 49 days.

(21) Appl. No.: 18/557,569

(22) PCT Filed: Apr. 29, 2022

(86) PCT No.: PCT/EP2022/061480
§ 371 (c)(1),
(2) Date: Oct. 26, 2023

(87) PCT Pub. No.: WO2022/229386
PCT Pub. Date: Nov. 3, 2022

(65) Prior Publication Data
US 2024/0219552 A1     Jul. 4, 2024

(30) Foreign Application Priority Data

Apr. 30, 2021 (EP) .................................... 21171524

(51) Int. Cl.
*G01S 13/34* (2006.01)
*G01S 13/931* (2020.01)
*H01Q 21/00* (2006.01)

(52) U.S. Cl.
CPC .......... *G01S 13/347* (2013.01); *G01S 13/343* (2013.01); *H01Q 21/0037* (2013.01); *G01S 2013/93271* (2020.01)

(58) Field of Classification Search
CPC ................. G01S 13/347; G01S 13/343; G01S 2013/93271; G01S 7/356; G01S 13/426;
(Continued)

(56) References Cited

U.S. PATENT DOCUMENTS 11,784,403 B2 * 10/2023 Olsen ........................ G01S 7/03
343/771
2012/0169525 A1 7/2012 Klar et al.
(Continued)

OTHER PUBLICATIONS

PCT/EP2022/061480. International Search Report & Written Opinion (Sep. 2, 2022).

*Primary Examiner* — Dimary S Lopez Cruz
*Assistant Examiner* — Brandon Sean Woods
(74) *Attorney, Agent, or Firm* — Anthony Smyth; LOZA & LOZA, LLP

(57) ABSTRACT

A radar system comprising an array of squintable elements, one or more tuners and a controller. A squintable element is an array of two or more resonant elements, wherein a first plurality of the squintable elements are configured to transmit an electromagnetic signal at a first frequency and a second plurality of the squintable elements are configured to receive a reflection of the electromagnetic signal. The controller is configured to control the one or more tuners to alter the frequency of the electromagnetic signal such that the first plurality of squintable elements transmits the electromagnetic signal at a second frequency, wherein the second frequency is different to the first frequency, and altering the frequency of the electromagnetic signal deflects the electromagnetic signal.

12 Claims, 12 Drawing Sheets

(58) Field of Classification Search

CPC .............. G01S 13/4454; G01S 13/931; H01Q 21/0037; H01Q 21/08; H01Q 1/3233; H01Q 13/206; H01Q 21/065; H01Q 3/22

USPC ........................................................ 343/702

See application file for complete search history.

(56) References Cited

U.S. PATENT DOCUMENTS

| | | |
|---|---|---|
| 2014/0070994 A1 | 3/2014 | Schmalenberg et al. |
| 2018/0106895 A1* | 4/2018 | Koerber ................ G01S 13/931 |
| 2020/0041611 A1* | 2/2020 | Scherz .................. G01S 13/345 |

* cited by examiner

Current Invention

Prior Art

Elevation Scan

MIMO Element Mapping

410a

Transmit Element

DSP (3D FFT
Processing)

420

Receive Elements
(seperation = d)

420     450a          450b 410a     410b

Transmit Elements
(separation = 4*d)

DSP (3D FFT Processing)

'Virtual' Elements

Receive Elements
(separation = d)

Normalised Radiation Pattern

Normalised Radiation Pattern

Wide beam, with high
angular
resolution in azimuth
(prior art)

Detection Without detail

Narrow 'scanned' beam
with high angular
resolution in both axes
(this invention)

Objects Separated

MIMO RADAR USING A FREQUENCY SCANNING ANTENNA

CLAIM OF PRIORITY

This application is the U.S. National Stage of International Patent Application No. PCT/EP2022/061480 filed 29 Apr. 2022, which claims priority to European Patent Application No. EP 21171524.8 filed 30 Apr. 2021, the entire content of these applications being incorporated herein by reference as if fully set forth below in its entirety and for all applicable purposes.

FIELD OF THE INVENTION

The present disclosure relates to a system and method for using a MIMO (Multiple Input Multiple Output) type radar with digital beamforming over two dimensions to detect objects and their location (range, azimuth angle and elevation angle) with increased resolution and lower latency. Amongst other applications, the system and method of the present disclosure have been found particularly useful for detecting objects in the surrounding environment of a vehicle.

BACKGROUND TO THE INVENTION

Those skilled in the art should note that the background to the invention provided herein is not a summary of the prior art and is instead provided herein as an introduction for the purpose of generally presenting the context of the disclosure. As such, this background section, as well as aspects of the description which may not otherwise qualify as prior art at the time of filing, are neither expressly or impliedly admitted as prior art against the present invention. The word 'or' as used herein is an inclusive or—i.e. 'A or B' covers the following list: A, B, and A and B.

At present, autonomous transportation is an active area of research in many countries. Autonomous transportation refers to transportation provided by self-driving vehicles. With over 1.2 billion automobiles in the world, self-driving vehicles clearly represents a huge emerging market for stakeholders (including both governments and private industry). However, for autonomous transportation to become a reality, affordable sensor systems with high performance and high reliability are necessary.

Technologies including radar, lidar, ultrasound, and cameras (e.g. single cameras, stereo cameras and camera arrays) have been utilised. Each of these technologies has its own inherent advantages and disadvantages. However, none of these technologies are currently adequate for widespread implementation in complex autonomous driving scenarios (such as busy city centre driving), due to one or more of a lack of: resolution, sensitivity, all-weather capability and affordability. For example, currently affordable radars can work in all weather conditions, but lack angular resolution and in some cases sensitivity. Radar angular resolution and sensitivity can be increased, but at a greatly increased cost. U.S. Ser. No. 10/573,959, U.S. Pat. Nos. 6,795,012, 7,924,215, EP1666914, JP2002228749, JP2004226158, U.S. Pat. Nos. 6,275,180, 8,686,894 and US 2020/041611 all discuss prior art radar systems and methods.

For the next generation of automotive radars, angular detection of objects with resolution in the order of 1 degree in both the azimuth (horizontal or x-axis) and elevation (vertical or z-axis) directions will be required. Full 360-degree coverage horizontally around the car (likely to be achieved by using multiple radar systems pointed at different angles) and a field of view of over 40 degrees in the vertical direction (to detect objects lying on the road or vehicles over the brow of a hill for instance) are also desirable.

In order to resolve the angular position of an object, a technique known as 'beam forming' is preferably used. This utilises an array of multiple radiators. As used herein, the term 'radiator' refers to the portion of an antenna that interacts with electromagnetic radiation, either by: i) emitting electromagnetic radiation if the antenna is a transmit antenna; ii) receiving electromagnetic radiation if the antenna is a receive antenna; or iii) both. Beam forming makes use of wave coherence between the radiators in the array to focus the energy transmitted or received by each radiating element into a narrow beam. As a result, the power in the direction of the beam's peak is increased, and the power in all other directions is reduced.

The characteristics of the beam, such as its steering angle, and beamwidth, can be manipulated through control of the amplitude and phase of the signal at each radiator in the array in both the x- and z-directions. By considering beam forming in one direction only, it is seen that larger arrays allow narrower beams, with increased focusing of the transmitted signal which leads to a higher array gain. The arrangement of transmit radiators (TX) in a radar system can therefore take on many different forms. Similarly, the arrangement of receive antenna elements (RX) in a radar system can take on many different forms.

U.S. Pat. Nos. 9,203,160, 9,869,762, US2017/0293028, U.S. Pat. No. 6,940,917, JP3405111, EP2527871, U.S. Pat. No. 9,041,596, JP3256374, U.S. Pat. No. 7,327,798, JP2017215328, CA2901610 provide some examples of antenna arrays or beam forming.

Beam forming can be performed by analogue circuit elements (analogue beam forming). Alternatively, beam forming can be performed in the digital domain (digital beam forming). When a signal is incident upon multiple radiators arranged along a line, there is a time delay between arrival time of the signal at each radiator. The time delay is dependent upon the angle of incidence of the signal. Both analogue and digital beams utilise this time delay. For example, for a wavefront impinging on an array of n radiators at an angle $\theta$, where the radiators are arranged in a line with a spacing of d between each radiator, the wavefront travels an extra distance of $(n-1)d\times\sin(\theta)$ to reach the $n^{th}$ element in the array compared to the $1^{st}$ element. This time delay gives rise to a progressive phase delay across the entire array, of $(n-1)\Phi$ at the $n^{th}$ element. If the signal arrives at each element simultaneously it corresponds to an angle of incidence of 0 degrees—i.e. the signal source is located on a line that is perpendicular to, and passes through the centre of, the line connecting the radiators and the line.

The progressive phase delay across the array can be calculated by performing a mathematical operation known as a Discrete Fourier Transform (DFT) on the magnitude and phase outputs from the array. The DFT can be computed using Fast Fourier Transform (FFT) algorithms, thereby enabling the angle $\theta$ to be estimated. For both the analogue and digital approaches, it is typically true that the greater the number of elements in either the transmit or the receive array, the finer the angular resolution that can be achieved. Thus, increasing the number of elements in either the transmit or the receive array increases the accuracy of the estimation of $\theta$. This, in turn, improves capacity of the system to detect and resolve the positions of multiple targets at similar angles.

Mathematically, this focusing effect produced by the array can be expressed as the array factor, which is the complex valued far-field radiation pattern of an array of isotropic radiators (i.e. theoretical radiators which have no directivity, and radiate or absorb equal energy in all directions). The one-dimensional array factor for a linear array is calculated at each discrete angle θ using:

$$AF(\theta) = \sum_{n=1}^{N} w_n e^{j\frac{2\pi n}{\lambda} d \sin(\theta)}$$

Where AF(θ) is the array factor at a given discrete angle θ, N is the total number of radiators in the array, $w_n$ is the complex weighting (having an amplitude and phase) at the $n^{th}$ element in the array, d is the element separation, and λ is the wavelength of the incident electromagnetic radiation. This equation is effectively a form of Discrete Fourier Transform (DFT):

$$X_k = \sum_{n=0}^{N-1} x_n e^{j\frac{2\pi}{N} kn}$$

Fourier Transforms are also used in Frequency Modulated Continuous Wave (FMCW) radar systems for target range and velocity estimation and can be computed using a Fast Fourier Transform (FFT).

The array factor can be converted into decibels as follows:

$$AF_{dB}(\theta) = 20 \log_{10}[AF(\theta)]$$

The steering angle of the array can be controlled by varying the phase of the weighting term $w_n$. When the array factor is calculated using the element locations of a physical array, and is multiplied by the radiation pattern of a single physical radiator of an antenna element in that array (i.e. the real element, having its own complex radiation pattern), the resulting radiation pattern provides a good approximation for the radiation pattern of the physical array. This approximation does not include effects such as mutual coupling between elements in the physical array which may alter the pattern. In decibel form, the gain of the array is given by:

$$G_A(\theta) = AF_{dB}(\theta) + G_E(\theta)$$

Where $G_A$ is the gain of the array and $G_E$ is the gain of a single element.

Beam forming and beam steering typically both use scaling (which is also referred to as tapering or weighting) to form a beam pattern. As used herein, scaling refers to the signal strength to or from different antenna elements ($w_n$) being amplified or attenuated to manipulate the overall shape of the combined beam of the array. When beam steering is applied on the transmitter side, the beam pattern is generally manipulated so that only one radiation pattern can exist physically at one time. On the receiver side however, digital beam forming could use different element scaling algorithms to form multiple beam patterns at the same time in parallel, to get multiple beams in different directions for instance.

It is possible to use multiple transmitters and receivers together to form a Multiple Input Multiple Output (MIMO) radar using a uniform linear array (ULA) or a sparse linear array (SLA). In a ULA, the antenna elements are arranged in a line with an equal spacing between each element and its neighbour. In an SLA, the antenna elements are arranged in a line, however the spacings between the elements may be irregular. Preferably, the elements in the SLA are spaced to increase the directivity of the beam. However, this is typically at the cost of increased sidelobe levels.

In a MIMO system, the magnitude and phase of the signal received at N receivers is measured for each of M transmitters. Further, it is possible in a MIMO system to form a 'virtual' receive array that is larger than the physical receive array, thereby improving object angular resolution. Various modulation schemes for MIMO exist which aim to achieve orthogonality between the signals transmitted by each individual transmitter, such that they can be separated out on the receiver side. These include but are not limited to Time Division Multiplex (TDM), Frequency Division Multiplex (FDM) and Binary Phase Multiplex (BPM).

In a TDM MIMO system, where it is possible to separately measure all TX and RX combinations, MTX×NRX signals are obtained, and the MIMO arrangement can be approximated to a single transmit antenna and MTX×NRX receive antennas. For a general MIMO system therefore the virtual antenna positions can be translated by $$x_{V(m_{Tx}, n_{RX})} = x_{TX}(m_{TX}) + x_{RX}(n_{RX})$$

Where xv are the coordinates of the virtual array, XTX are the coordinates of the TX antennas and $x_R$X are the coordinates of the RX antennas and m and n are the $m^{th}$ and $n^{th}$, TX and RX antennas respectively.

As shown in FIG. 1, for TDM MIMO array 120, which uses separate ULAs for TX and RX, the transmitters sequentially transmit a signal one at a time. The receive elements 125a then receive signals originating from each of the transmitters sequentially in time, and these can thereby be separated according to which transmitter the signal originated from. When the spacing between said transmit and receive elements is set accordingly, the signals at each receiver can be rearranged corresponding to the transmitter from which they originated. As a result, the phase differences on each received radiated wave is such that an equivalent larger number of receive elements appear than are present. Thus "virtual" elements 125b are created. To put it differently, receive array 125 is functionally the same as receive array 115 which has double the number of antennas. The virtual array 125 functions as if it comprises M×N number of elements, whilst only making use of M+N physical antenna radiators. Therefore, the angular resolution of the virtual array is much finer than that of the physical array, when it is not used in a MIMO implementation.

With continuing reference to FIG. 1, when the MIMO system is used in TDM mode, each virtual element in the MIMO system cannot be measured at the same time. Instead, measurement must be repeated M times (i.e. one measurement for each transmit element) on each of the N receive elements. The MIMO technique is therefore effective for improving the angular resolution of the radar for a given number of transceivers, or to decrease the number of transceivers required to obtain a given angular resolution.

FIG. 1 shows a ULA MIMO configuration for a system. As a result, the radar will only have good angular resolution in the azimuth direction (i.e. a rotation around an axis bisecting, and perpendicular to, the line of the array). However, such a radar will have no angular resolution with respect to elevation (i.e. a rotation around the line of the array).

FIG. 2 shows an alternative arrangement of a MIMO array 200 suitable for obtaining coverage in two dimensions (2D). Here the transmit elements 210 are in one linear orientation, while the receive elements 220 are in another linear orientation, wherein the two linear orientations are perpendicular to each other. This produces a 2D virtual array 250. The virtual array 250 has 16 virtual elements. Thus, it is possible to determine elevation target angles. However, the angular resolution in the azimuth is halved by comparison to array 125 shown in FIG. 1, as some virtual elements are disposed for the elevation (vertical) plane. Thus, there is a need to provide a radar system that is able to determine elevation without reducing the resolution of azimuth angle readings.

The present disclosure is directed towards a system and method that expands the one-dimensional high angular resolution provided by a MIMO array, similar to that shown in FIG. 1, to two dimensions without increasing the number of real or virtual antenna elements in the MIMO array.

SUMMARY OF THE INVENTION

The present disclosure is directed towards systems and methods, the features of which are set out in the appended claims.

In particular, the present disclosure is directed towards a radar comprising: an array of squintable elements wherein: a squintable element is an array of two or more resonant elements; a first plurality of the squintable elements are configured to transmit an electromagnetic signal at a first frequency; and a second plurality of the squintable elements are configured to receive a reflection of the electromagnetic signal at the first frequency; one or more tuners; and a controller configured to control the one or more tuners to alter the frequency of the electromagnetic signal such that the first plurality of squintable elements transmit the electromagnetic signal at a second frequency and the second plurality of squintable elements receive the reflection at the second frequency, wherein the second frequency is different to the first frequency; and altering the frequency of the electromagnetic signal deflects the electromagnetic signal.

Preferably, the squintable elements are arranged in a first line and the radiating elements within a squintable element area are arranged in a second line wherein the first and second lines are not parallel.

Preferably, the spacing between each of the second plurality of the squintable elements is d and the spacing between each of the first plurality of squintable elements is N*d and N is the number of squintable elements in the second plurality, whereby a uniform linear array of N×X virtual antennas is produced, where X is the number squintable elements in the first plurality.

Alternatively, the spacing between each of the second plurality of the squintable elements and the spacing between each of the first plurality of squintable elements is arranged to provide a linear array of N×(X−M) virtual antennas, wherein: N is the number of squintable elements in the second plurality; X is the number squintable elements in the first plurality; and M is a number of at least one, and corresponds to the number of virtual antenna overlaps within the virtual antenna array.

Alternatively, some form of sparse array may be implemented to improve the directivity of the beam, whereby the spacings between the each of the first plurality of squinting elements, and each of the second plurality of squinting elements are not regular, and designed to achieve a specific performance in terms of beam shape, directivity, side lobe levels, etc.

The term 'squintable element' refers to an array of radiating elements having a radiation pattern that can be squinted in a direction orthogonally to a plane by altering the operating frequency of the squintable element, wherein the plane is the plane in which the beam of an array of squintable elements can be steered. As a specific example, a squintable element may be a travelling wave antenna array orientated normal to the line of the array of squintable elements.

In another embodiment, the squintable element may comprise a one-dimensional phased array antenna orientated normal to the line of the array of squintable elements.

In one embodiment, the first plurality of squintable elements comprise travelling wave antennas orientated normal to the line of the array of squintable elements and the second plurality of squintable elements comprise one-dimensional phased array antennas orientated normal to the line of the array of squintable elements.

In one embodiment, the one-dimensional phased array antennas comprise a phase shifter, wherein the phase shifter is configured to apply a phase shift between elements of each one-dimensional phased array antenna so as to receive the reflection of the electromagnetic signal transmitted from the first plurality of the squintable elements.

The travelling wave antenna is preferably a series-fed patch antenna. Alternatively, other travelling-wave antennas such as e.g. leaky waveguide antennas, leaky substrate integrated waveguide antennas, microstrip combine antennas may be used. As a further example, a resonant antenna such as the Fabry Perot antenna may be used as a squintable element.

Preferably, the system comprises two or more transceivers configured to transmit and receive an electromagnetic signal.

Preferably, the signal is a frequency modulated continuous wave signal.

The present application is also directed towards a method of detecting an object. The method comprises providing an array of squintable elements wherein: a squintable elements is an array of two or more resonant elements; a first plurality of the squintable elements are configured to transmit an electromagnetic signal at a first frequency; and a second plurality of the squintable elements are configured to receive a reflection of the electromagnetic signal at the first frequency; and tuning one or more tuners to alter the frequency of the electromagnetic signal such that the first plurality of squintable elements transmit the electromagnetic signal at a second frequency and the second plurality of squintable elements receive the reflection at the second frequency, wherein the second frequency is different to the first frequency; and altering the frequency of the electromagnetic signal deflects the electromagnetic signal.

Preferably, the squintable elements are arranged in a first line and the radiating elements within a squintable element area are arranged in a second line wherein the first and second lines are not parallel.

Preferably, the squintable element is a series-fed patch antenna orientated normal to the line of the array of squintable elements.

In one embodiment, the squintable element is a one-dimensional phased array antenna orientated normal to the line of the array of squintable elements.

In one embodiment, the first plurality of squintable elements comprise travelling wave antennas orientated normal to the line of the array of squintable elements and the second plurality of squintable elements comprise one-dimensional phased array antennas orientated normal to the line of the array of squintable elements.

In one embodiment, the method further comprises:
applying a phase shift between elements of each one-dimensional phased array antenna so as to receive the reflection of the electromagnetic signal transmitted from the first plurality of the squintable elements.

Preferably, the method comprises operating two or more of the antennas as transceivers configured to transmit and receive an electromagnetic signal.

Preferably, the signal is a frequency modulated continuous wave signal.

The present disclosure is also directed towards a computer readable storage medium. The storage medium comprises instructions which, when executed by a processor, cause the processor to perform a method according to the appended method claims when the processor is coupled to an array of squintable elements wherein: a squintable element is an array comprising two or more resonant elements; a first plurality of the squintable elements are configured to transmit an electromagnetic signal at a first frequency; and a second plurality of the squintable elements are configured to receive a reflection of the electromagnetic signal at the first frequency.

BRIEF DESCRIPTION OF THE DRAWINGS

The invention will be more clearly understood from the following description of an embodiment thereof, given by way of example only, with reference to the accompanying drawings, in which:—

FIG. 5a shows the beam pattern of the radar shown in FIG. 4a;

DETAILED DESCRIPTION OF THE DRAWINGS

Conventional digital beamforming architectures incorporate a dedicated receiver for each antenna element. As antenna array sizes become larger however the number of receivers required becomes exceedingly expensive for applications such as e.g. automotive radar. When a low angular resolution is required, a wide beam is sufficient and is obtained when a small number of antenna elements are used. This means that a minimal number of receivers can be employed.

However, when high angular resolution is required, a narrower beam is needed, and a larger antenna array with additional elements must be utilised. Additional receivers are therefore required, resulting in an increase to the overall radar cost and size. This means that for certain applications (e.g. automotive radar) which require low cost, a conventional architecture is limited to a minimal number of elements and hence a wide beam.

Figure 4A:
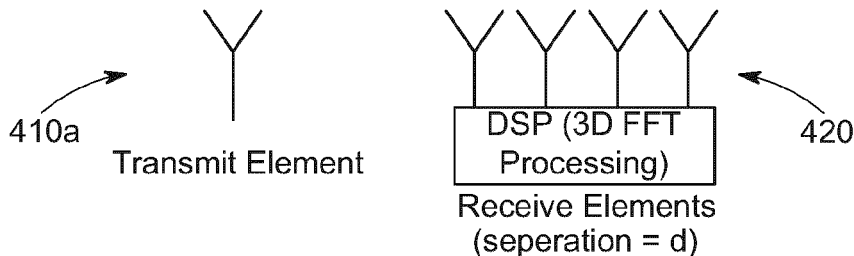
FIG. 4a shows a radar configured with one transmit element and four receive elements.
Figure 4B:
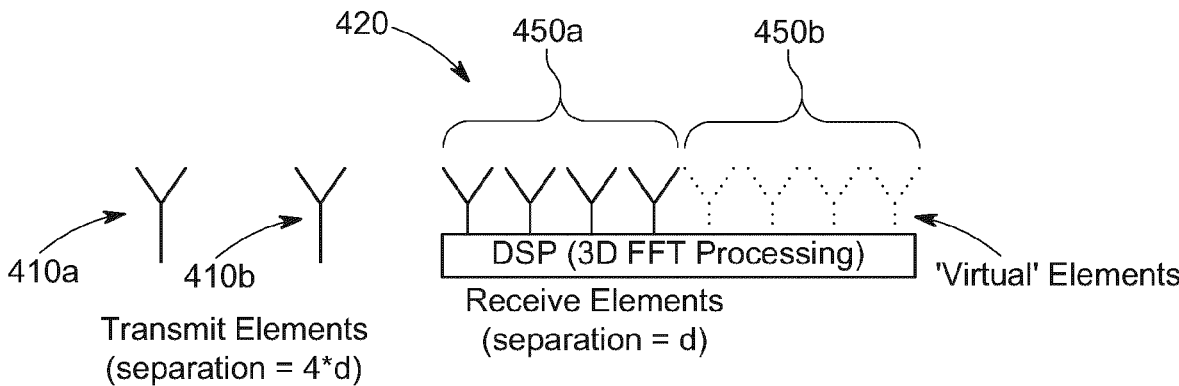
FIG. 4b shows a MIMO radar configured with two transmit elements and four receive elements.
Figure 5A:
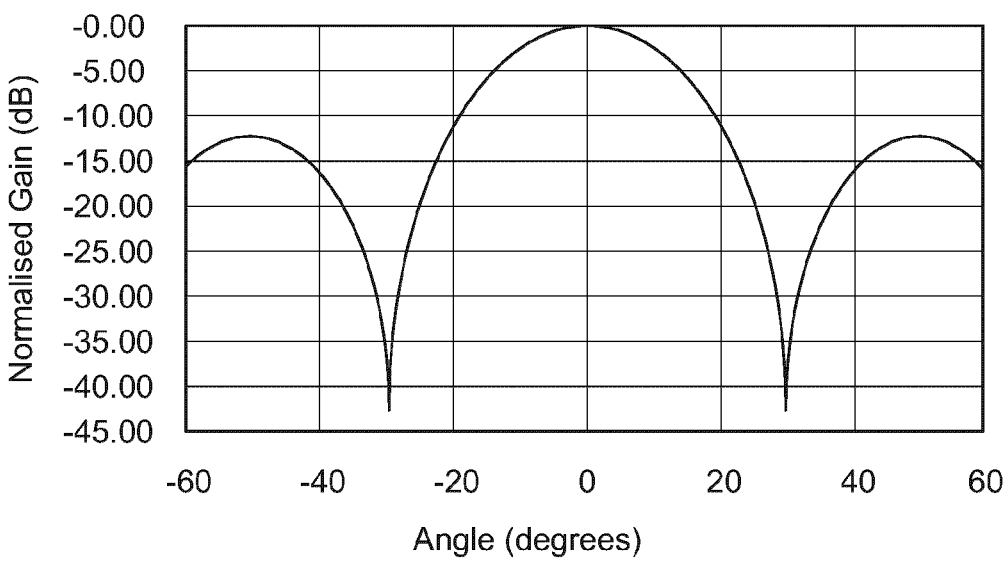
Figure 5B:
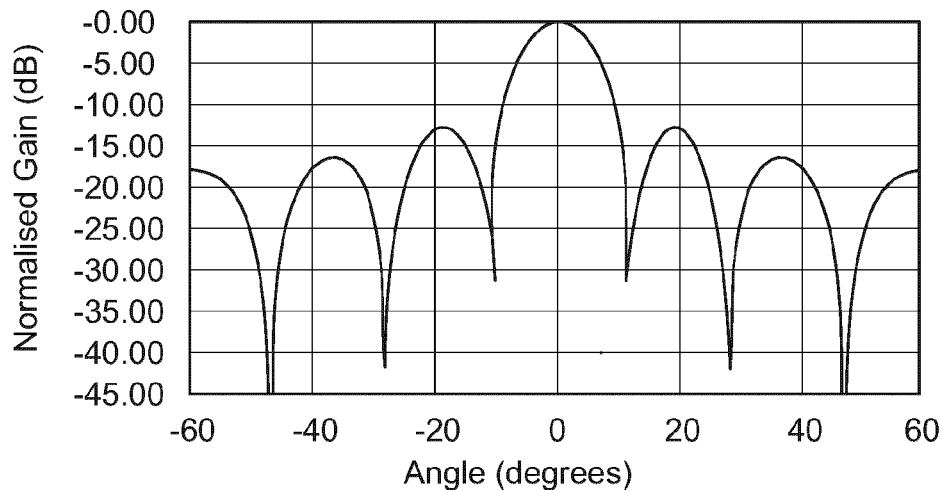
FIG. 5b shows the beam pattern of the radar shown in FIG. 4b.

For a MIMO radar, the number of receivers is less of a limiting factor, as MIMO radars can synthesise virtual arrays with a large aperture using only a small number of transmit and receive antennas. For example, FIG. 4a shows the radar configured with one transmit element 410a and four receive elements 420. This radar provides a 4-element beam pattern shown in FIG. 5a. However, as shown in FIG. 4b, by introducing a second transmit antenna element 410b and the same four receivers 420, a 4-element virtual array 450b is added to the existing 'real' 4-element array 450a, resulting in the 8-element beam pattern shown in FIG. 5b.

Thus, the angular resolution is doubled, not by the addition of four additional receive elements, but by the addition of only one single transmit element. When the antenna beam patterns are further examined, the effect on the angular resolution becomes apparent as the beamwidth is reduced by half, thus doubling the angular resolution.

Figure 6:
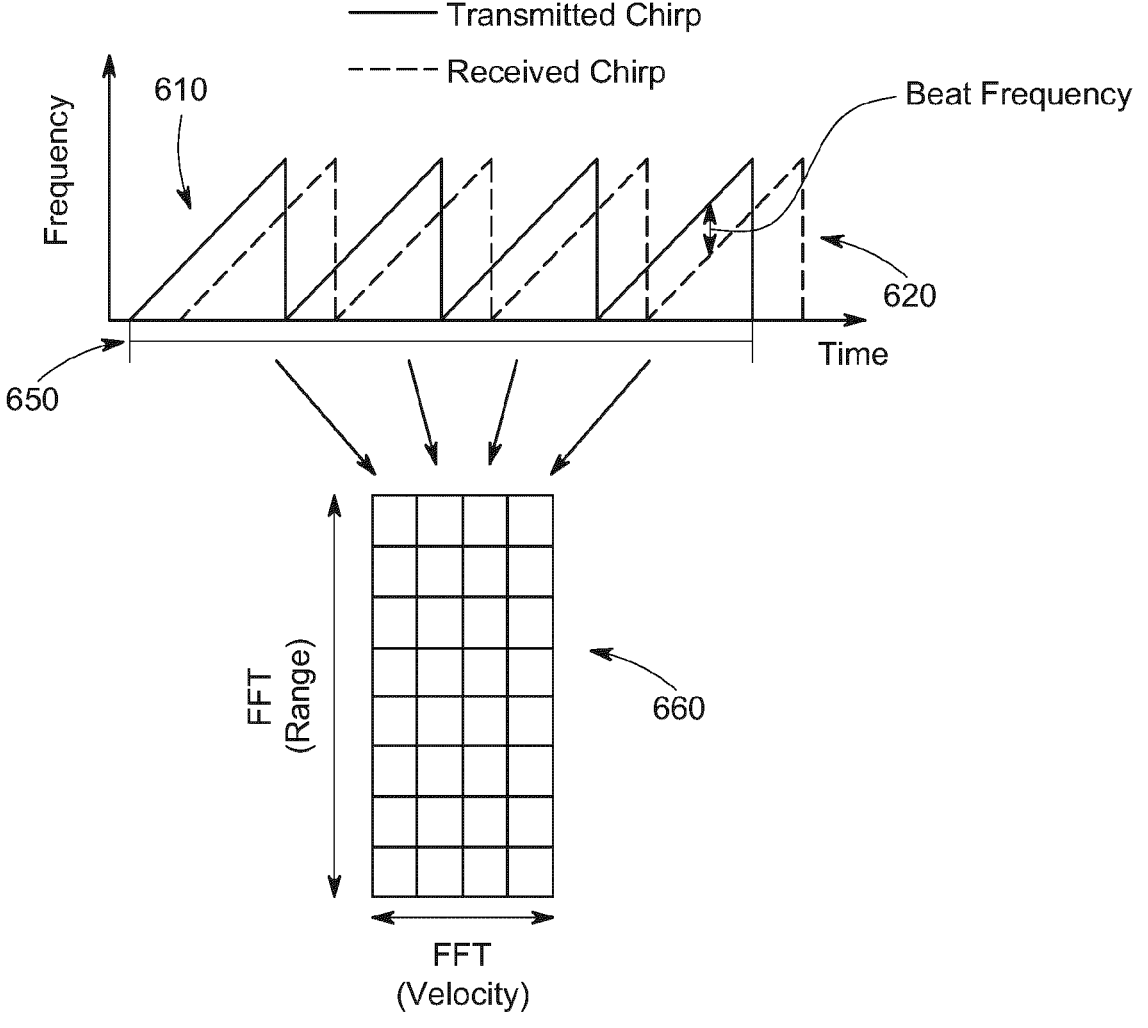
FIG. 6 shows a frame of four transmitted FMCW chirps using a single transmit and single receive channel, and a corresponding 2-dimensional range-doppler FFT output.

According to the present disclosure, FMCW (Frequency Modulated Continuous Wave) modulation is preferably used. FMCW is a common type of modulation known to those familiar with the field. A FMCW waveform, also referred to as a chirp, is a sinusoidal waveform whose frequency increases linearly with time. FMCW radars typically transmit chirps in a periodic fashion, at a period referred to as the pulse repetition interval (PRI) and most commonly in a sawtooth configuration, although other chirp types are available. FIG. 6 shows a sequence, or frame, of four transmitted chirps 610. The resulting target echo 620 from the scene, arriving at a single receiver, will contain a delayed and attenuated copy of the transmitted chirps. Mixing the received signal 620 with the transmitted chirp 610 produces a complex sinusoidal waveform. This waveform is known as the beat signal and its frequency is proportional to the distance to a detected object. Multiple chirps are collected within a single 'frame' 650, which thereby allows determination of doppler frequency changes in the time domain. The object's velocity can be estimated based on the determination of doppler frequency changes.

The estimation of the beat frequency is usually implemented in the digital domain, after the beat signal has been digitally sampled. Since the beat frequency is much smaller than the radar bandwidth, a low-speed analogue-to-digital converter (ADC) can be used. By sampling the beat signal and placing the samples for each chirp into separate columns of a matrix, the row indices of the matrix will correspond to the times taken across a single chirp (referred to herein as 'fast times') and the column indices will correspond to the time taken across multiple chirps (referred to herein as 'slow times'). By employing a Fast Fourier Transform (FFT) to calculate the DFT of each column of the matrix, the range of any object in the radar field of view is determined through a determination of their beat frequencies. By applying a further FFT along the rows of the matrix, the velocity of the objects can be determined through detection of the doppler frequency.

The use of these two FFTs is commonly named a 2D FFT and allows the range and velocity of objects to be determined. A concomitant benefit of performing the 2D FFT is that it lowers the noise floor through matched filtering of the object's beat and doppler frequencies. In practice, the number of objects that fall into the same range-velocity bin will typically be small, depending on the range and velocity resolution of the radar.

Figure 7:
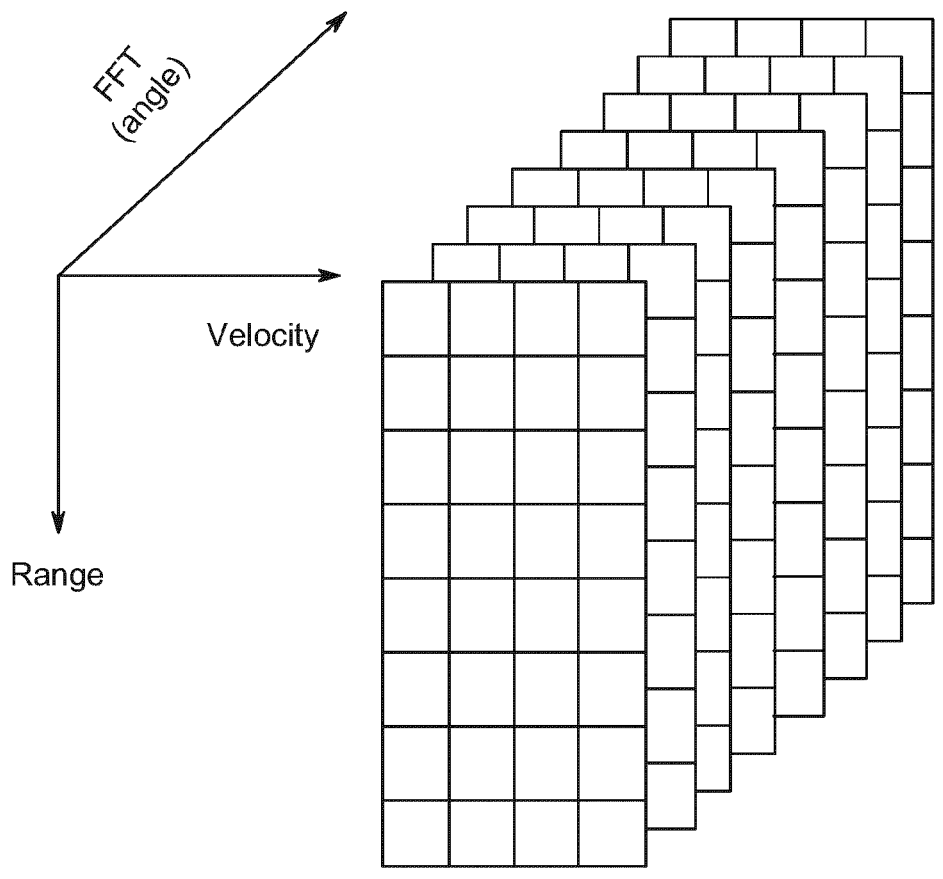
FIG. 7 shows the 3-dimensional range, velocity and angle Fast Fourier Transforms performed on a series of received FMCW chirps with the signals arriving at multiple receivers providing the angle FFT dimension.

While the range-velocity plot obtained from a 2D FFT 660 gives a lot of useful information, it lacks detail on an object's angular position. By taking instantaneous range-velocity plots at each of the receivers (including those both real and virtual by TDM) target angles may be determined. A third 'angle' FFT or 3D FFT is performed across the 2D FFT outputs for each receiver, as shown in FIG. 7. Constant False Alarm Rate (CFAR) thresholding may then be applied. CFAR thresholding is where only bins with a signal-to-noise that exceeds a predetermined threshold are retained.

An angular resolution of less than 1° in each plane is the current requirement in automotive safety radars. To obtain this resolution at boresight, a virtual array of over 115 elements is required, assuming a half-wavelength spacing between the elements of the array. While the method described above gives good angular resolution in the horizontal plane, no angular resolving capability is provided for the vertical plane. Hence, e.g. for autonomous driving applications, objects lying on the road or over the brow of a hill will be not be detected. One method to extend the angular resolving capability to both azimuth and elevation is to use a rectangular virtual array for the MIMO 250. However, to achieve a high angular resolution around both axes requires a much higher number of transmit and receive channels.

Figure 8:
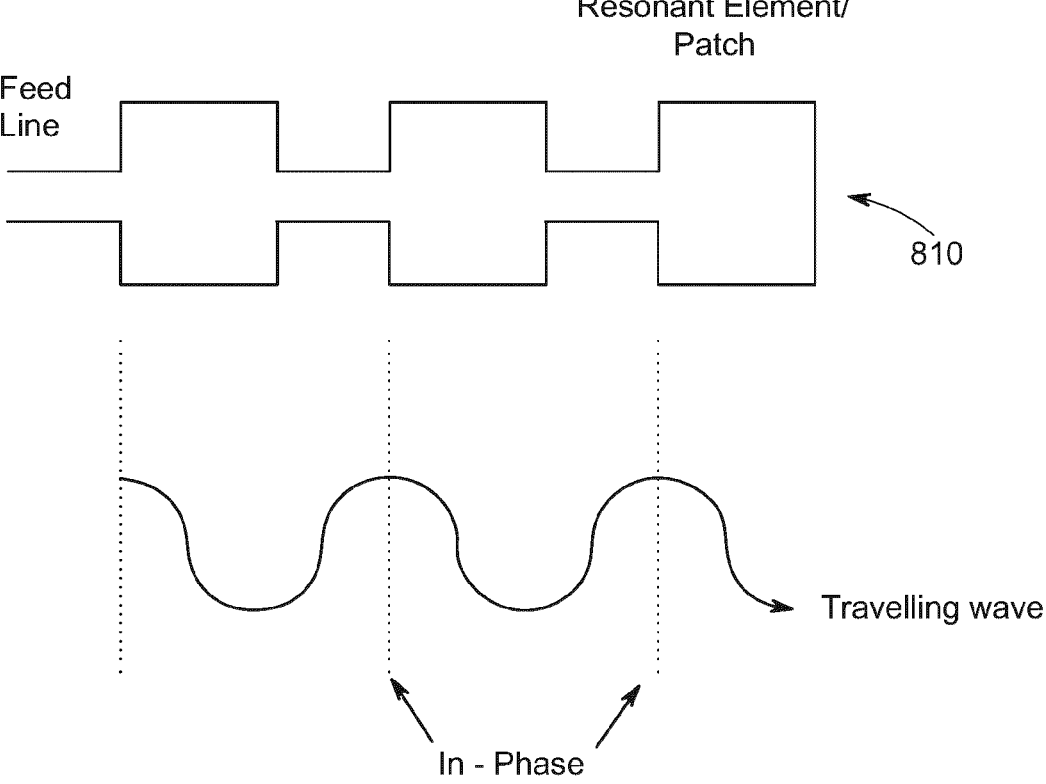
FIG. 8 shows a series-fed microstrip antenna array.

To overcome this problem, a system in accordance with the present disclosure uses a conventional travelling wave antenna array—such as e.g. a conventional series fed microstrip 810, as shown in FIG. 8. Examples of series-fed antennas are described in the papers entitled "Procedure to Design a Series-fed Microstrip Patch Antenna Array for 77 GHz Automotive Radar," by B. Jian, et al., "A Novel Series-Fed Taper Antenna Array Design," by T. Yuan, et al., and "Design and Simulation of the Series-Fed Microstrip Antenna Arrays," by T. Xiuwen, et al. It is noted that alternative travelling-wave antennas could be used also.

Preferably, the feed line of an end-fed array is narrow compared to its patch width. Further, the radiating patches or 'resonant elements' should be resonant to ensure that the input line is well matched to the radiating patch. In the simplest model of a patch antenna, this corresponds to the resonant element having a length of half the guided wavelength.

As the amplitude and phase of the radiated fields at each patch are determined by the cumulative characteristics of all the patches on the feed line, the transmission characteristics of the patches must be determined accurately in order to achieve the desired amplitude and phase distributions of radiating currents along the array. Therefore, since the resonant element length is approximately a half-guided wavelength, the connecting feed line between elements must also be a half-guided wavelength for a summation of the radiated field at boresight.

In practice, when the frequency of operation changes, this balance will not be observed, and a progressive phase delay or lead is introduced. By way of example, if a phase delay of $\alpha$ degrees is introduced (as the result of a frequency change) between the 1st and 2nd patches, then this delay will be increased to $2\alpha$ between the 1st and 3rd patches, and a delay of $n\alpha$ will be introduced between the 1st and $(n+1)^{th}$ patches.

Figure 9:
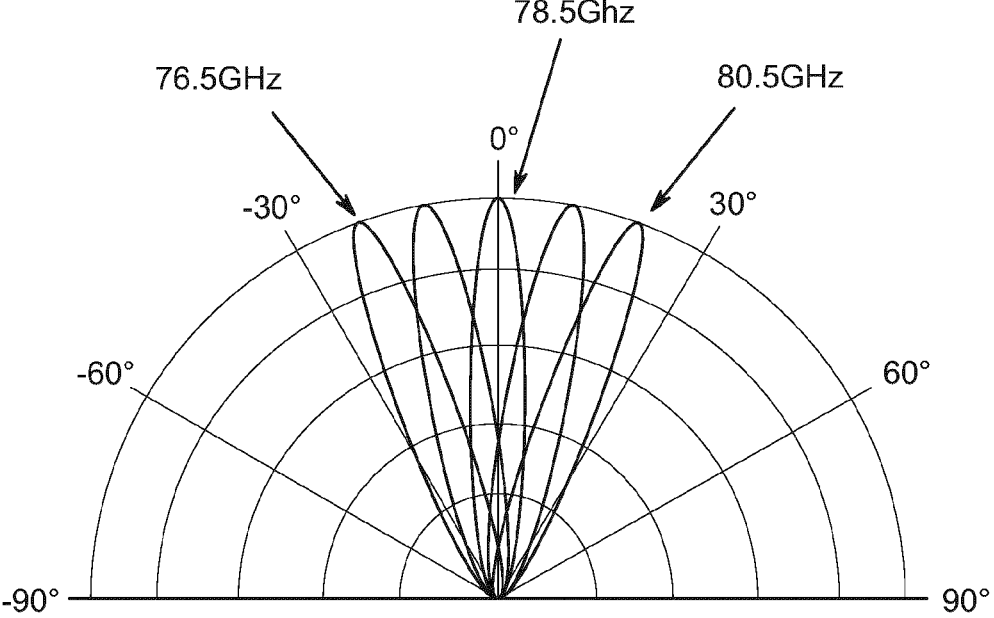
FIG. 9 shows the squinting of a radiation pattern as the frequency of the electromagnetic signal is varied.
Figure 9:
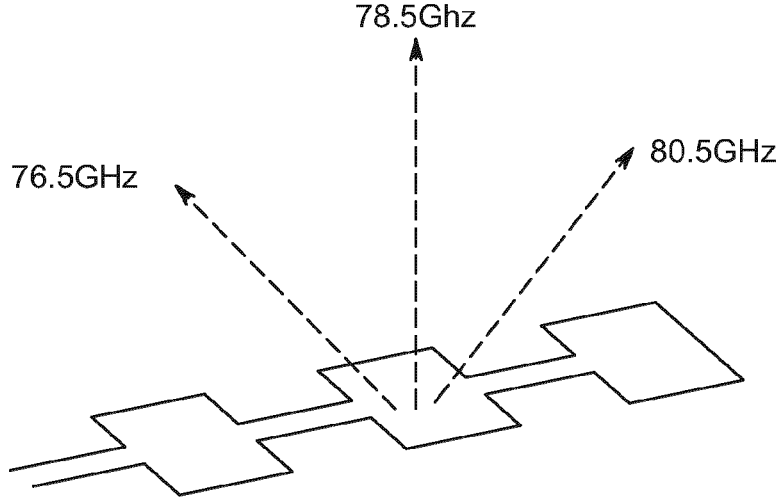
Figure 10:
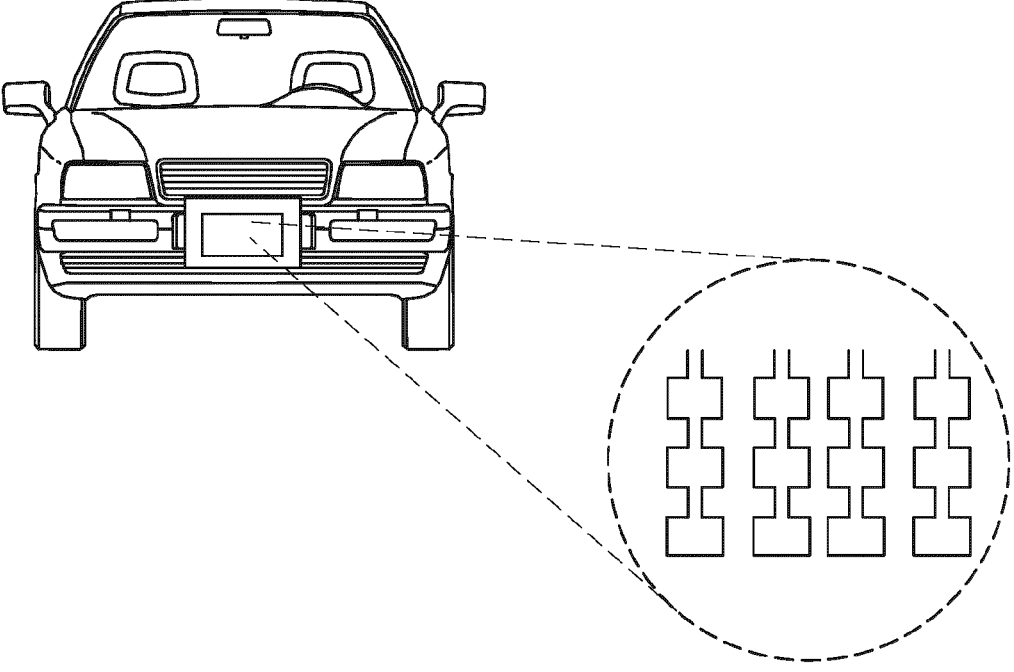
FIG. 10 shows series-fed antennas orientated parallel to the vertical axis and arranged in an array along a line perpendicular to the vertical.

This allows the antenna's radiation pattern to be pointed or 'squinted' to an angle off boresight. Thus, a 'squintable element' that contains a minimum of 2 resonant antennas can be squinted through adjusting the phase between them with a change in frequency. Thus, with a series-fed patch array designed at 78.5 GHz, by operating at frequencies above and below this, the beam will be squinted along the direction of the feed line, as shown in FIG. 9. Preferably, fractions of the 76-81 GHz frequency band are used, as these frequencies are typically used for automotive radars. Thus, the beam provided by an ULA of series-fed patch antennas can be angularly directed along the elevation direction. In particular, the series-fed antennas are orientated parallel to the vertical or elevation axis and arranged in an array along a line perpendicular to the vertical in accordance with the MIMO arrangement, or equivalent, as shown in FIG. 10. By changing the frequency of operation, the beam formed by the array can be angularly directed along the elevation direction as a result of each antenna's radiation pattern being 'squinted' as described above. The orientation illustrated in FIG. 10—whereby the feed line for the series-fed array is directed in the −z direction—is such that when the frequency is reduced the beam will be pointed towards the sky and when the frequency is increased the beam will be pointed towards the ground, although those familiar in the art will appreciate that the operation will still be valid if the antenna array is rotated 180°. Furthermore, the change in angular direction is proportional to the change in frequency.

Figure 1:
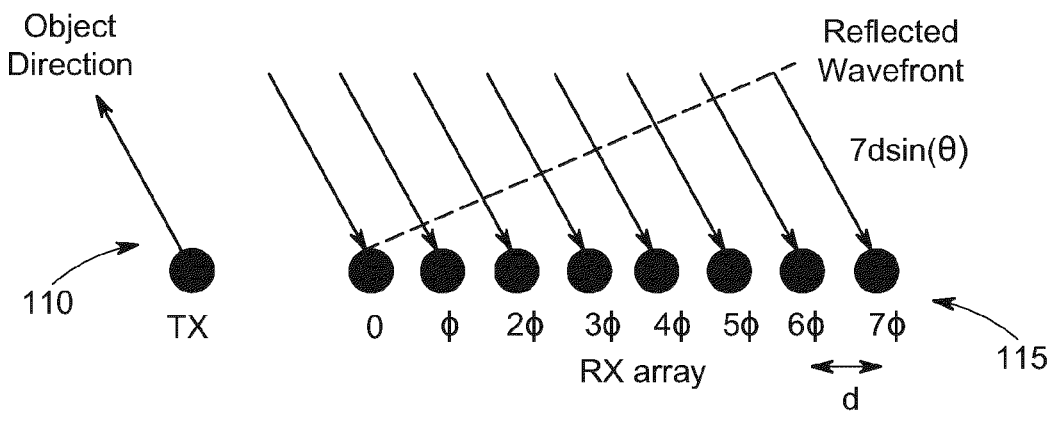
FIG. 1 shows the antennas required for a conventional receive array of 8 elements with a single transmit element, and one embodiment of the antennas required to obtain an equivalent virtual antenna array in a MIMO system.
Figure 1:
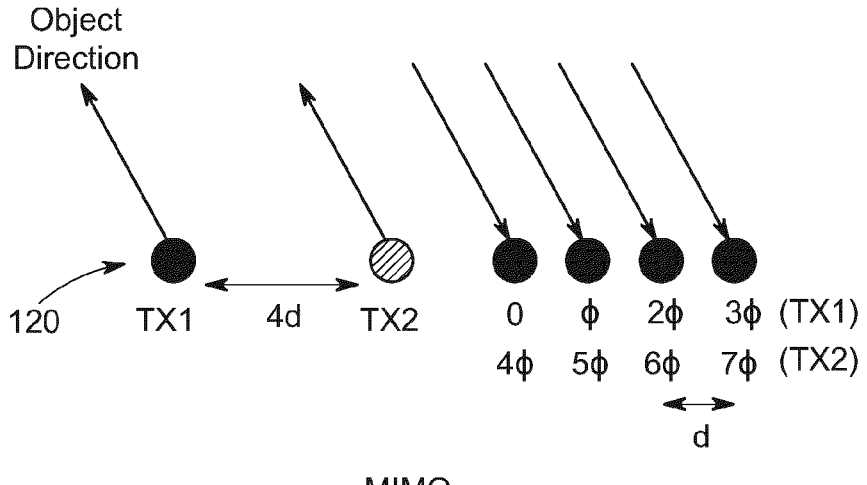
Figure 1:
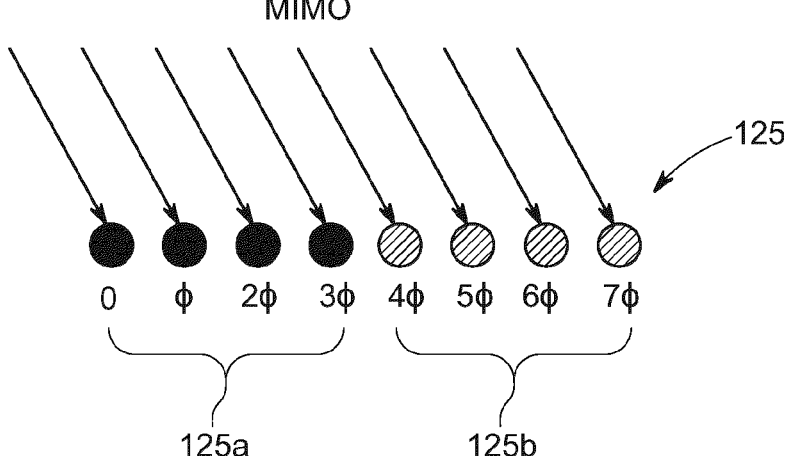
Figure 2:
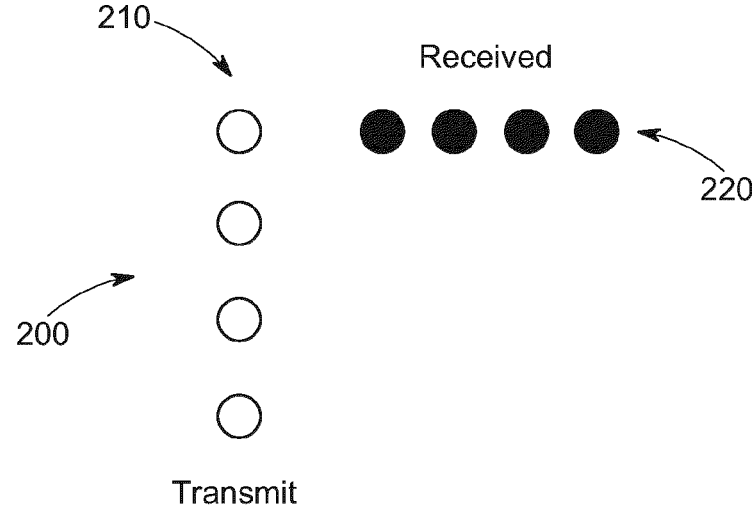
FIG. 2 shows one embodiment for a two-dimensional MIMO virtual antenna array.
Figure 2:
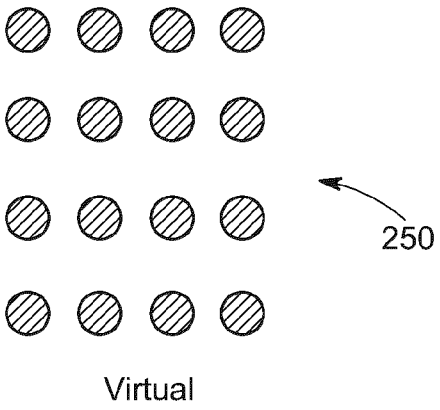
Figure 3:
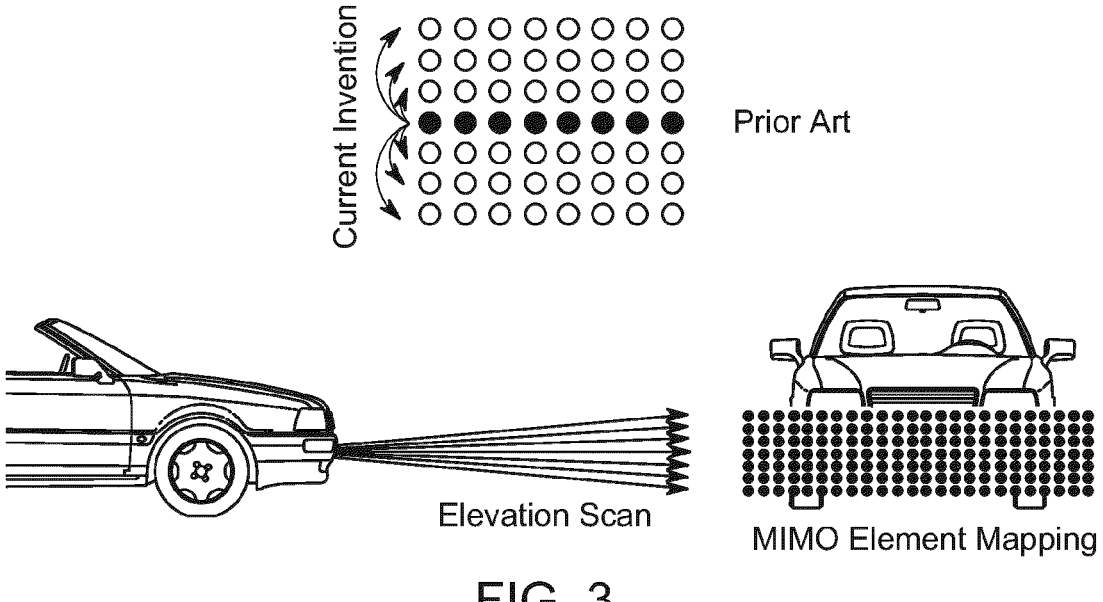
FIG. 3 shows a system in accordance with the present disclosure, where, by altering the frequency of an electromagnetic signal, the beam pattern of a one-dimensional virtual array can be squinted (i.e., displaced)
Figure 11:
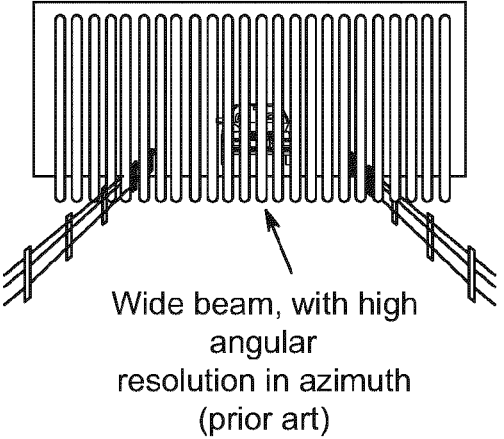
FIG. 11 shows the comparison of a MIMO radar detection plot for a vehicle passing under a bridge, for a conventional horizontal plane MIMO radar and that derived from this invention.
Figure 11:
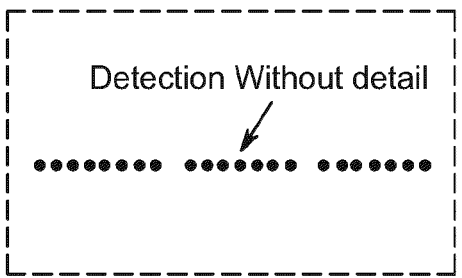
Figure 11:
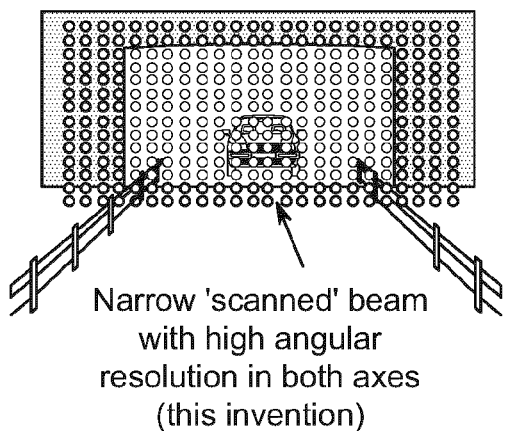
Figure 11:
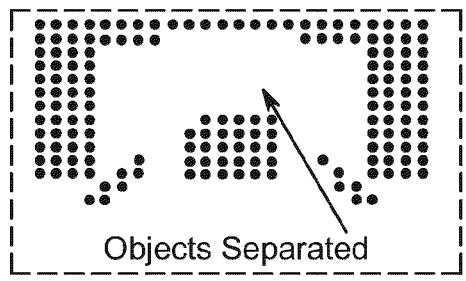

A common example showing the importance of high angular accuracy over both the horizontal and vertical planes is given in FIG. 11, where vehicles passing under a bridge, tunnel or overpass are unseen if the angular accuracy in the vertical plane is insufficient. FIG. 11 shows the comparison between this invention and a similar radar where all MIMO virtual elements lie in the horizontal plane, and it can be seen that the vehicle becomes merged with the bridge in the radar output using this conventional system. For a typical MIMO radar specification of 1 degree resolution in azimuth (115 virtual elements in the horizontal plane) and 2.5 degree resolution in elevation (50 elements in the vertical plane), this means that the typical number of elements in the 2-dimensional virtual array, 250 in FIG. 2, would be 115×

50=5750 elements, compared to the 115 virtual elements required for this invention, although the number of elements can be reduced in both cases, by means of employing an SLA or other techniques.

For a ULA, beamwidth is inversely proportional to the number of elements in the array. E.g. in a typical MIMO radar system, the elevation beamwidth is set by the required field-of-view of the radar specification. However, in a system in accordance with the present disclosure, detection in the vertical plane is a function of frequency. As a result, a larger number of patch elements can be added to the series-fed array, giving a narrower beamwidth. With more resonant elements and a narrow beam, the gain is increased. Thus, both the detection range and angular resolution of the radar is improved along the axis of the array.

In a system according to the present disclosure, angular detection in the horizontal plane is determined as described above for other MIMO radar systems. However, angular detection in the vertical plane is determined by adjusting the operational frequency of the system and is therefore independent of the azimuth calculations. Moreover, a complete set of azimuth calculations can be completed at each frequency or chosen elevation angle. In this way, a full 2D angular detection mapping and 3D 'point cloud' can be obtained.

The above description illustrates the case where the maximum available virtual array is implemented in the azimuth or MIMO plane. By ensuring that all virtual elements only appear in the horizontal orientation, the maximum possible angular resolution is achieved in the horizontal plane for a given number of transmitters and receivers. The virtual array may be implemented in the form of either a ULA or a sparse array. In a sparse array, the spacings between the squintable elements are non-uniform. This results in the sparse array giving a larger effective aperture, forming a narrower beamwidth and thus achieving better angular resolution.

By increasing the number of resonant elements in each of the series fed antennas in the array, the array beamwidth in elevation is reduced. Thus, the angular position of objects can be resolved with greater detail in elevation. Furthermore, increasing the number of resonant elements in each series-fed antenna also increases the antennas' gain, thereby increasing the detection range of the radar.

The above illustrative examples have been presented to provide a person skilled in the art with a clear understanding of present disclosure. However, those skilled in the art will note that the above illustrative examples do not limit the scope of the present disclosure and many alterations can be made to the present disclosure without departing from its scope.

For example, some virtual elements may be mapped to the same virtual array location—thereby introducing overlaps in the virtual array. Introducing overlaps in the virtual array may be desirable in certain implementations—for example to increase the maximum unambiguous velocity which the radar can detect. In particular, through sampling of the doppler frequency at the same virtual array location in multiple time slots in a TDM MIMO system the doppler resolution can be improved. Thus, although this arrangement will reduce the angular resolution in azimuth, this arrangement may be useful in situations where determining the velocity of an object is important. This may be useful for example in calculating an estimated time of impact.

Figure 12A:
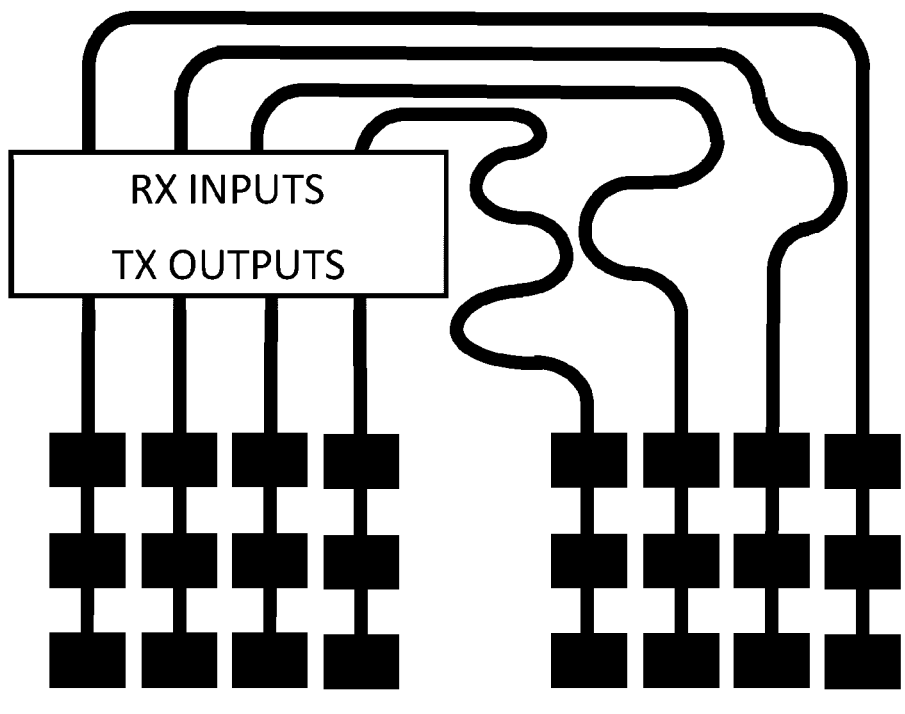
FIG. 12a shows one embodiment of the present disclosure where the radar semiconductor chip has transmit and receive channels at opposite sides and the transmit antennas and the receive antennas comprise series-fed microstrip antennas.

FIG. 12*a* shows one embodiment of the present invention where each squintable element comprises a travelling-wave antenna and the transmit (TX) channels of the radar semiconductor chip circuitry are on opposite sides to the receive (RX) channels. To ensure that an additional phase delay is not added between receive channels, the feed lines of the travelling wave antennas must be of identical length. Alternatively, any differences in phase delay between receive channels can be removed mathematically in the radar calculations. Furthermore, an additional length is needed to ensure that the transmit antennas and the receive antennas lie in the same orientation. As the travelling wave antennas forming the transmit antennas and the travelling wave antennas forming the receive antennas are positioned in the same orientation, a frequency shift to squint each antenna's radiation pattern means that the transmit antennas and the receive antennas will be squinted in the same direction. However, the requirement of an additional length to ensure the transmit antennas and the receive antennas lie in the same orientation adds an additional loss to the receive signals and results in a reduction in the usable range of the radar.

In one embodiment of the invention, one or more of the travelling wave antennas can be replaced with a one-dimensional phased array arranged in a substantially vertical line. A phase-shifter or other component steers the beam produced by the one-dimensional phased array, to change the beam's angular position in the vertical direction. This obviates the need for shifting the frequency of operation to steer the beam. However, additional control circuitry is required to set the required phase shifts needed to squint the beam. Such a configuration may be used for example in radar systems where the transmit outputs and the receive inputs from the radar transceiver chip are located at opposite sides of the chip, in order to avoid the loss in signal which results from the use of additional length of lines when all the antennas are implemented by travelling wave antennas. This configuration also results in a reduction in size compared to the embodiment where the transmit and receive antennas are both implemented by travelling wave antennas as well as the simplification of the layout of the circuitry. It also means that transmit antennas can be arranged in a mirrored configuration to the receive antennas relative to the transceiver chip.

Figure 12B:
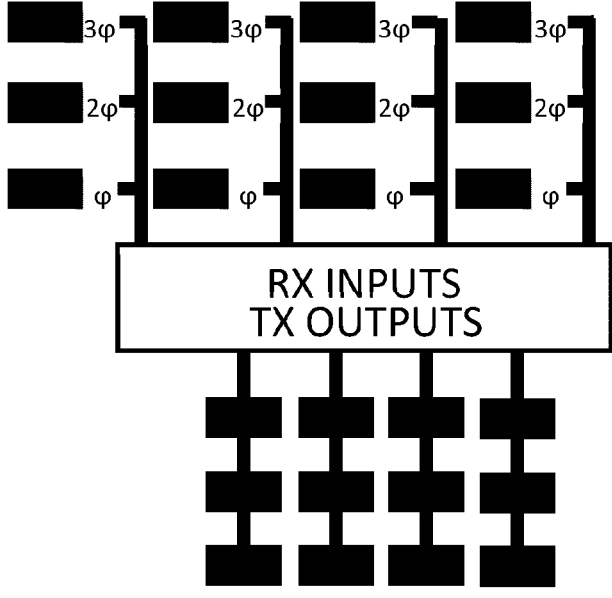
FIG. 12b shows an alternative embodiment of the present disclosure where the radar semiconductor chip has transmit and receive channels at opposite sides and the transmit antennas comprise series-fed microstrip antennas and the receive antennas comprise a one-dimensional phased array.

FIG. 12*b* illustrates an embodiment for a transceiver chip having the transmit and receive channels at opposite sides, where each receive antenna comprises a one-dimensional phased array arranged in a vertical line and each transmit antenna comprises a travelling wave antenna. In this embodiment, the transmit antenna's beam is squinted in the elevation direction by a change in frequency and the receive antenna receives signals at the same frequency and direction, by means of the application of a phase shift between the receive elements of each one-dimensional phased array. In the embodiment shown in FIG. 12*b*, the receive elements are equally spaced along the one-dimensional phased array. It will be appreciated by those familiar in the art that phase shifters generally have high loss, resulting in a reduction in array gain and therefore detection range. However, this loss is commonly less than the added loss when all antennas are formed by travelling wave antennas, due to the increased line length required to align the transmit and receive antennas in the same orientation.

The added phase between elements is a well-known formula that depends on the separation distance, d, between the consecutive antenna elements and the wavelength of the operating frequency, λ, where:

$$\phi = \frac{360 d \sin\left(\frac{\theta \pi}{180}\right)}{\lambda}$$

13

Hence, by equating the squinting angle, ⊖, which is induced by the change in frequency of operation at the transmit antenna, the direction of beam squinting can be matched by changing the phase shift between consecutive elements along the receive antenna.

Alternatively, one or more of the series-fed antennas may be replaced using a suitable antenna in which the same frequency scanning can be implemented. For example, leaky waveguide antennas, leaky substrate integrated waveguide antennas, Fabry Perot antennas, microstrip comb-line antennas etc.

In a further alternative configuration, one or more of the series-fed antennas can contain amplitude tapered patches. Although this arrangement reduces the gain of the system, the use of amplitude tapered patches may be desirable in certain implementations for shaping the cumulative radiation pattern from all the patches on the feed line. In particular, through the use of amplitude tapered patches, sidelobes are significantly reduced in the pattern in the vertical plane. This in turn reduces the detection of 'ghost targets' at incorrect angles.

The number of patches in the series-fed array may be reduced for certain implementations. Reducing the number of patches has the effect of lowering gain and angular resolution in elevation, but also reducing the size of the radar. This may be useful for shorter range applications where range and/or angular resolution specifications are less challenging.

Alternatively, the number of patches can be increased. This is useful for longer range applications, where increasing gain and/or angular resolution in elevation is important. As a result, the physical size of the radar will increase. Further, additional scans are required to cover the same elevation field of regard, leading to longer scan times.

Although an FMCW MIMO radar system has been described to detect returns in the horizontal plane, in alternative systems other radar implementations including pulsed and monopulse or MIMSO (EP20214700) types can be used.

In a further arrangement using any of the previously described configurations, and which provides partial detections in the vertical plane along with detections in the horizontal plane, the described method can be used to provide enhanced or refined detections along the vertical plane.

The systems and methods disclosed herein are particularly suited for use in automotive applications e.g. for hazard detection. In such applications, radars using electromagnetic radiation having a wavelength of ten millimetres or less (i.e. a millimeter-wave radar) are preferred.

Whilst the present disclosure has been described primarily with reference to automotive applications (for which it is particularly suited), those skilled in the art will note that the systems and methods disclosed herein can be used for other applications, such as e.g. defence or warfare.

Those skilled in the art will also recognise that although the present disclosure has been described in terms of scanning in the vertical direction, the arrangement may be flipped so that the MIMO or alternative radar configuration is arranged such at 90° to the configurations described above. In this alternative arrangement, frequency scanning is performed in azimuth, rather than elevation.

The invention claimed is:

1. A radar system comprising: an array of squintable elements wherein: a squintable element is an array of two or more resonant elements; a first plurality of the squintable elements of the array of squintable elements arranged linearly along a first direction is configured to transmit an electromagnetic signal at a first frequency; and a second plurality of the squintable elements of the array of squintable elements arranged linearly along or parallel to the first direction is configured to receive a reflection of the electromagnetic signal, wherein the first plurality of the squintable elements of the array of squintable elements comprise travelling wave antennas orientated normal to the line of the array of squintable elements and the second plurality of the squintable elements of the array of squintable elements comprises one-dimensional phased array antennas, each orientated normal to the line of the array of squintable elements; one or more tuners and one or more phase shifters; and a controller configured to control the one or more tuners to alter the first frequency of the electromagnetic signal for deflecting the electromagnetic signal to change an angular position of a beam formed by the first plurality of the squintable elements of the array of squintable elements in the orientation direction of the travelling wave antennas, wherein the one or more phase shifters are configured to steer the beam formed by the second plurality of the squintable elements of the array of squintable elements to change the beam's angular position in the direction of the one-dimensional phased array antennas.

2. The system of claim 1, wherein the squintable elements are arranged in a first line and the two or more resonant elements within a squintable element area are arranged in a second line wherein the first and second lines are not parallel.

3. The system of claim 1, wherein the one-dimensional phased array antennas comprises a phase shifter, wherein the phase shifter in the one-dimensional phased array antennas is configured to apply a phase shift between elements of each one-dimensional phased array antenna so as to receive the reflection of the electromagnetic signal transmitted from the first plurality of the squintable elements of the array of squintable elements.

4. The system of claim 1, further comprising two or more transceivers configured to transmit and receive an electromagnetic signal.

5. The system of claim 1, wherein the electromagnetic signal is a frequency modulated continuous wave signal.

6. A method of detecting an object comprising: providing an array of squintable elements wherein: a squintable element is an array of two or more resonant elements; a first plurality of the squintable elements of the array of squintable elements arranged linearly along a first direction is configured to transmit an electromagnetic signal at a first frequency; and a second plurality of the squintable elements of the array of squintable elements arranged linearly along or parallel to the first direction is configured to receive a reflection of the electromagnetic signal, wherein the first plurality of the squintable elements of the array of squintable elements comprise travelling wave antennas orientated normal to the line of the array of the squintable elements and the second plurality of the squintable elements of the array of squintable elements comprise one-dimensional phased array antennas, each orientated normal to the line of the array of squintable elements; changing an angular position of the beam formed by the first plurality of the squintable elements of the array of squintable elements in the orientation direction of the travelling wave antennas by tuning one or more tuners to alter the first frequency of the electromagnetic signal for deflecting the electromagnetic signal in the given direction; and providing one or more phase shifters to steer the beam formed by the second plurality of the squintable elements of the array of squintable elements in the orientation direction of the one-dimensional phased array antennas.

7. The method of claim 6, wherein the squintable elements are arranged in a first line and the two or more resonant elements within a squintable element area are arranged in a second line wherein the first and second lines are not parallel.

8. The method of claim 6, further comprising: applying a phase shift between elements of each one-dimensional phased array antenna so as to receive the reflection of the electromagnetic signal transmitted from the first plurality of the squintable elements of the array of squintable elements.

9. The method of claim 6, wherein altering the frequency of the electromagnetic signal deflects the electromagnetic signal along the direction of the first line.

10. The method of claim 6, comprising operating two or more antennas as transceivers configured to transmit and receive an electromagnetic signal.

11. The method of claim 6, wherein the signal is a frequency modulated continuous wave signal.

12. A computer readable storage medium comprising instructions which, upon executed by a processor when the processor is coupled to a linear array of squintable elements, cause the processor to: provide a linear array of squintable elements wherein: a squintable element is an array of two or more resonant elements; a first plurality of squintable elements of the linear array of squintable elements is configured to transmit an electromagnetic signal at a first frequency; and a second plurality of the squintable elements of the linear array of squintable elements is configured to receive a reflection of the electromagnetic signal, wherein the first plurality of the squintable elements of the array of squintable elements comprise travelling wave antennas orientated normal to the line of the array of squintable elements and the second plurality of the squintable elements of the array of squintable elements comprise one-dimensional phased array antennas, each orientated normal to the line of the array of squintable elements; change an angular position of the beam formed by the first plurality of the squintable elements of the array of squintable elements in the orientation direction of the travelling wave antennas by tuning one or more tuners to alter the first frequency of the electromagnetic signal for deflecting the electromagnetic signal in the given direction; and provide one or more phase shifters to steer the beam formed by the second plurality of the squintable elements of the array of squintable elements in the orientation of the one-dimensional phased array antennas.

* * * * *